United States Patent Office

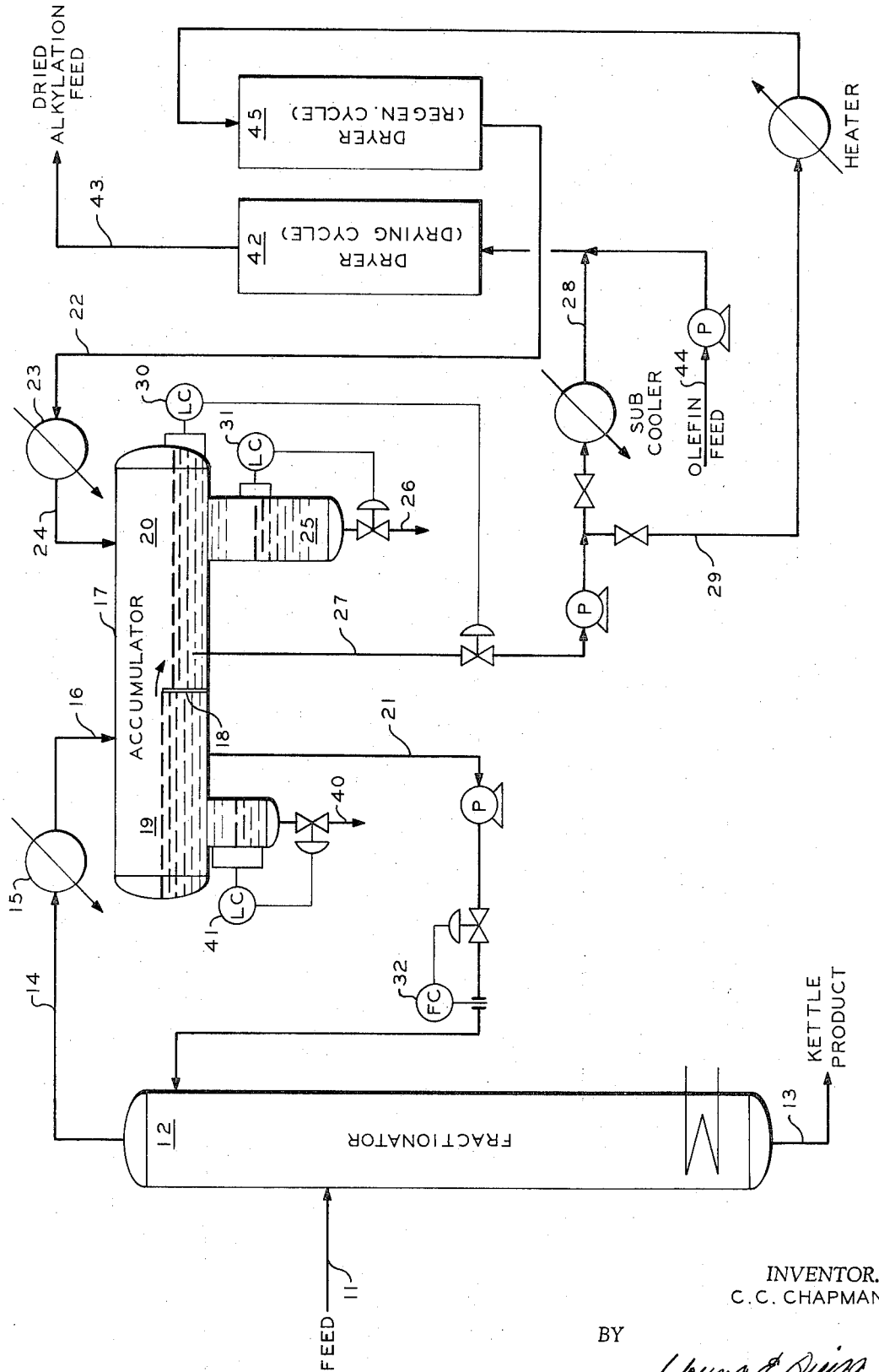

3,822,193
Patented July 2, 1974

3,822,193
PROCESS AND APPARATUS FOR MAINTAINING A DIVIDED ACCUMULATOR
Charles C. Chapman, Bartlesville, Okla., assignor to Phillips Petroleum Company
Filed Sept. 24, 1971, Ser. No. 183,472
Int. Cl. B01d 3/00
U.S. Cl. 203—39          9 Claims

ABSTRACT OF THE DISCLOSURE

A method is provided whereby liquid paraffin is accumulated and distributed from a vessel divided internally by a weir, so that two disparate streams can be maintained in the vessel with mixing of inlet materials on one side of the weir while maintaining an unmixed material on the other side of the weir. In one embodiment of the invention isobutane reflux liquid is maintained on one side of the weir and overflowed into a second zone where it is mixed with the wet effluent from a feed stream drier which contains isobutane, olefins, and water. Free water is trapped from the mixed stream and decanted from this zone.

BACKGROUND OF THE INVENTION

This invention relates to accumulation vessels internally divided by a weir. In one aspect this invention relates to a method for accumulating liquid hydrocarbons. In another of its aspects this invention relates to the decanting of water from an accumulation vessel. In still another of its aspects this invention relates to maintaining a separate unmixed stream within a vessel having more than one stream feeding into it.

In one of its concepts this invention relates to maintaining a separate unmixed stream within a vessel having more than one stream feeding into it by separating the feed streams with a weir and overflowing material from the zone containing the stream to be kept separate into another zone where the feed streams are allowed to mix.

In a chemical process a tank or section within a fractionating column is often used for accumulating condensed vapor from a fractionation operation. These vessels are usually denominated as accumulators and are generally used when at least part of the accumulated condensate will be used as reflux in the fractionation operation. The material stored in the accumulator assures a ready supply of reflux for the distillation.

Various kinds of accumulators have been used, the simplest of which is a vessel having an inlet line and an outlet line for the condensate. When the condensed material is of the type that will separate into two phases an accumulator having an internal weir is often used to separate these phases. The heavier material forms a phase in the bottom of the tank behind the weir and is removed from the bottom of the tank. The lighter material, forming a phase that rises on top of the heavier material, is allowed to overflow the weir and is removed as a separate stream on the other side of the weir.

I have discovered that using a vessel divided internally by a weir two disparate liquids can be processed in the same vessel allowing mixing of the disparate liquids on one side of the weir while maintaining one of the liquids on the other side of the weir without mixing of the disparate liquids.

Accordingly, it is an object of my invention to provide a method of operating an accumulating vessel containing an internal weir with inlet and outlet lines so that two disparate liquids can be processed in the vessel with mixing of the liquids on one side of the weir while the liquid on the other side of the weir is not mixed with the other liquid feed. It is another object of my invention to provide a method for processing two disparate liquids in the same vessel providing two streams of liquid effluent from the vessel one being an unmixed stream and the other a stream that is mixture of the disparate liquids. It is still another object of this invention to provide a method for removing free water from a mixture of disparate liquids in an accumulator vessel containing an internal weir. It is yet another object of this invention to provide a method and apparatus for processing a predominately isobutane inlet stream and an inlet stream containing isobutane, olefins, and water into the same vessel to obtain an outlet stream of isobutane unmixed with the liquid olefin and an outlet stream containing a mixture of the predominately isobutane inlet stream and the inlet stream containing olefins.

Other objects, advantages and features of my invention will be readily apparent to those skilled in the art from the following description, the drawing, and the appended claims.

SUMMARY OF THE INVENTION

According to the invention a liquid is fed into a first zone of a vessel divided internally by a weir, a portion of the liquid is allowed to flow over the weir into a second zone into which is also fed a second liquid inlet stream comprising at least one liquid component not contained by the first liquid inlet stream. Sufficient material is caused to flow out of the second zone to prevent flow of liquid from the second zone to the first zone and a stream of liquid, unmixed with liquid from the second zone, is removed from the first zone.

In one embodiment of the invention a liquid paraffin stream is accumulated in the first zone of a vessel internally divided by a weir and the paraffin is allowed to flow over the weir into a second zone into which is also fed a liquid stream containing paraffin, olefins, and water. Sufficient mixture of the two inlet streams is withdrawn from the second zone to maintain the liquid level in that zone below the top of the weir and paraffin liquid which has not been mixed with material from the second zone, is withdrawn from the first zone.

In another embodiment of the invention the liquid in the second zone separates into two immiscible phases and the heavier phase is collected at the bottom of the second zone and removed as a separate stream.

In another embodiment of the invention free water from the inlet to the second zone collects as a separate phase in the bottom of the second zone and is removed as a separate stream.

The accumulator vessel suitable for use in this invention can be described as an enclosed vessel of any shape and of size dependent upon the amount of material through put desired for the vessel. The vessel is separated internally with a weir which with the sides and bottom of the vessel forms a solid dam dividing the lower portion of the vessel into two separate zones interconnected by an open space above the top of the weir. There is a means of liquid ingress in each zone of the vessel, a means of liquid outlet below the top of the weir in the first zone and a means of liquid outlet below the top of the weir in the second zone. In the embodiment of the invention requiring separation of water from the mixture in the second zone the outlet means for the liquid mixture can be sufficiently above the bottom of the vessel to provide space for separate water phase or a water separation leg can be constructed onto the underside of the vessel. Automatic control for maintaining a liquid level in the second zone for decanting a water phase from the second zone and for maintaining a liquid flow from the first zone are also appropriate for this invention.

The method of this invention is adapted for use with accumulators in hydrocarbon processing operations, particularly as product and reflux accumulators in fractionating operations. This invention allows recycle streams containing components that, if circulated as reflux, would be lost from the base of the fractionating column, to be returned to the accumulator for mixing with the product stream thus saving the cost of additional tankage. The invention is particularly suitable for use with a fractionator having a paraffin product stream, part of which is returned to the fractionator as reflux. By the process of this invention recycle containing olefins, water or other liquids can be mixed with the product stream without being returned to the fractionator as reflux.

Referring now to the single figure drawing, and using an accumulator processing both the overhead isobutane make from a mixed butane fractionator and the wet effluent from an alkylation reactor feed drier as an example to illustrate the process of this invention, a mixed butane feedstock is fed through line 11 into a fractionator 12 from which a kettle liquid stream with an average composition of about 95 percent normal butane and 5 percent isobutane is removed through line 13. An overhead stream consisting of about 88 percent isobutane, about 8 percent normal butane and about 4 percent propane is transferred as a vapor through line 14 into a condenser 15 where it is condensed to a liquid and transported through line 16 into the accumulator 17. The accumulator 17 is divided internally by a weir 18 into a first zone 19 and a second zone 20. The liquid isobutane make stream 16 feeds into the first zone 19 where it fills the zone bounded by the accumulator walls and weir 18 and overflows the weir into the second zone 20. Reflux for the fractionator 12 is removed from the first zone 19 as desired through line 21.

The wet effluent from the regeneration of an alkylation reactor drier is fed through line 22 condenser 23, where it is condensed to a liquid, and line 24 into the second zone 20 of the accumulator 17. This stream is comprised, by volume, at beginning of flow, of approximately 46 percent isobutane, 38 percent olefins, and about 2 percent water. By returning this wet drier regeneration stream to the accumulator 17 into the zone 20 downstream of the weir 18 the olefins in the stream are retained in the material fed to the reaction and are not lost from the system with the fractionator kettle liquid. The liquid level in the second zone 20 is maintained so that liquid cannot flow from the second zone 20 to the first zone 19. Free water collects in a settling leg 25 entry to which is from the bottom of zone 20. The water collected is removed through line 26. A stream comprising, by volume, approximately 70 percent isobutane, 13 percent normal butane and 10 percent olefins is removed from the second zone 20 through line 27 to be fed through line 28 to a drying system as feed for an alkylation reaction system or through line 29 to be heated for the regeneration cycle of the alkylation feed driers and hence back to line 22.

Flows for the various lines out of the accumulator 17 can be controlled automatically through liquid level controller 30 on line 27, liquid level controller 31 on line 26 and flow controller 32 controlling the reflux flow through line 21.

There is some water knocked out in section 19 of accumulator 17, and this water is removed via 40 on level control 41. Drier 42 is on drying cycle and the olefin feed 44 plus the isobutane stream 28, after subcooling, are admixed and passed through drier 42, and removed as dried alkylation feed 43. Drier 45 is on the regeneration cycle (usually about 16 hours per day). The purge material 29 is heated and used to regenerate drier 45. Effluent from drier 45 is recovered via 22. The composition of the effluent varies from the beginning of the regeneration cycle to the end (see example below), because the drier, at the start of the regeneration cycle, contains about 200 barrels, in a specific run, of the alkylate feed. At the end of the run, only the regeneration fluid is present in this drier, which is now on standby.

TYPICAL OPERATION

| | Start | Finish |
|---|---|---|
| Butane splitter (12): | | |
| Pressure, p.s.i.g. | | 117 |
| Top temp., °F. | | 141 |
| Bottom temp., °F. | | 169 |
| Overhead accumulator (17): | | |
| Pressure, p.s.i.g. | | 105 |
| Temp., °F. | | 120 |
| "Wet" effluent (24) from drier on regeneration: | | |
| Pressure, p.s.i.g. | 105 | 105 |
| Temp., °F. | 105 | 105 |
| Vol., barrels/hr.[a] | 57 | 57 |
| Composition, vol. percent: | | |
| $C_3$ and $C_4$ olefins | 37.7 | |
| Propane | 6.1 | 7.3 |
| Isobutane | 46.0 | 78.7 |
| Normal butane | 10.2 | 14.0 |
| Water, lbs./day | 700 | |
| Butane splitter overhead (16): | | |
| Temp., °F. | | 141 |
| Volume, barrels/hr. | | 1,200 |
| Composition, vol. percent: | | |
| Olefins | | None |
| Propane | | 7.3 |
| Isobutane | | 78.7 |
| Normal butane | | 14.0 |
| Reflux (21): | | |
| Temp., °F. | | 141 |
| Volume, barrels/hr. | | 1,110 |
| Composition, vol. percent: | | |
| Olefins [b] | | None |
| Propane | | 7.3 |
| Isobutane | | 78.7 |
| Normal butane | | 14.0 |
| Hydrocarbon yield (27): | | |
| Temp., °F. | 105 | 105 |
| Volume, barrels/hr.[a] | 207 | 150 |
| Composition, vol. percent: | | |
| Olefins | 10.0 | Trace |
| Propane | 7.0 | 7.3 |
| Isobutane | 69.6 | 78.7 |
| Normal butane | 13.4 | 14.0 |
| Water (hydrocarbon is saturated with $H_2O$ at 105° F.) | | |
| Water Yield (26) | | About 700 pounds/day |

[a] The regeneration of the spent drier is cyclic, usually on regeneration for 16 hours/day. The drier contains about 200 barrels of liquid.
[b] No olefins are in the reflux 21, hence no loss of heavier olefins out of tower 12 via conduit 13.

Reasonable variation and modification are possible within the foregoing disclosure, the drawing and the appended claims to the invention the essence of which is that a method has been provided for processing two disparate liquid streams in an accumulator divided by an internal weir so that the two streams are mixed for discharge from one zone of the accumulator while inlet liquid to the other zone is discharged without being mixed with the other inlet material. This system allows recycle streams containing compounds that would be lost in reflux to a fractionating column to be recycled to a vessel serving as a reflux accumulator saving the expense of additional tankage while keeping the recycle stream separate from material used as reflux.

I claim:

1. A method for accumulating and distributing liquid streams comprising:
   (a) feeding a first liquid from a fractionator column overhead into a first chamber within an enclosed vessel divided internally into two distinct chambers by a weir,
   (b) overflowing the first liquid over the weir into a second chamber within said vessel,
   (c) feeding into the second chamber a second liquid produced as described below comprising at least one component not contained in the first liquid,
   (d) removing at least a portion of the first liquid from the first chamber at a predetermined rate,
   (e) removing a mixture of the first liquid and second liquid from the second chamber at a rate such that flow of liquid from the second chamber to the first chamber is prevented,
   (f) passing a major portion of said mixture with a stream of a component not contained in said first liquid through a drying system to be dried, and
   (g) passing the remaining portion of said mixture in seriatum through (1) a heater, (2) as regeneration fluid through a dryer which had been used in step (f) above and (3) through a cooler thereby producing said second liquid stream.

2. The method of claim 1 wherein the first liquid is a paraffin and the second liquid comprises the same and olefin.

3. The method of claim 2 wherein the paraffin is predominately isobutane.

4. The method of claim 1 wherein the second liquid separates into two immiscible phases and the heavier phase is collected from the bottom of the second chamber and removed as a separate stream.

5. The method of claim 4 wherein the immiscible liquids are water and a mixture of hydrocarbons, said hydrocarbons comprising paraffins and olefins.

6. An apparatus for accumulating and distributing liquid process streams comprising in combination
   (1) an accumulating vessel comprising:
      (a) a closed vessel divided internally by a weir into a first and second chamber,
      (b) an inlet means into the first chamber of the vessel,
      (c) an inlet means into the second chamber of the vessel,
      (d) an outlet means from the first chamber of the vessel in a position below the top of the weir, and
      (e) an oulet means from the second chamber of the vessel in a position sufficiently below the top of the weir to allow maintaining the liquid level in the second chamber below the top of the weir,
   (2) a fractionation column with reflux inlet means connected to the outlet means of the first chamber of the accumulating vessel and with overhead product outlet means connected to a condensing means which is connected to the inlet means of the first chamber of the accumulator, and
   (3) means connecting the outlet means of the second chamber of the accumulating vessel to a means for drying product passing regeneration material there-through with means for returning regeneration material passed through said dryer back to said inlet means into the second chamber of the accumulating vessel.

7. An apparatus of claim 6 wherein there is also provided a second outlet means from the second chamber disposed in relation to the other outlet means from the second chamber to allow separate withdrawal of two separated immiscible liquids from the second chamber.

8. An apparatus of claim 6 wherein there is also provided a second outlet means from the first chamber disposed in relation to the other outlet means from the first chamber to allow separate withdrawal of two separated immiscible liquids from the first chamber.

9. The method of claim 1 wherein the first liquid separates into two immiscible phases and the heavier phase is collected from the bottom of the first chamber and removed as a separate stream.

References Cited
UNITED STATES PATENTS

| | | | |
|---|---|---|---|
| 2,868,723 | 1/1959 | Gilmore | 196—14.52 |
| 1,297,171 | 3/1919 | Holley et al. | 210—511 |
| 1,682,939 | 9/1928 | Schwab et al. | 210—511 |
| 2,818,459 | 12/1957 | Gantt | 203—84 |
| 3,096,380 | 7/1963 | Plaster | 203—14 |
| 3,206,524 | 9/1965 | Bolten | 203—70 |
| 2,946,832 | 7/1960 | Vermilion, Jr. | 260—683.43 |
| 2,956,411 | 10/1960 | Gilmore | 62—20 |
| 3,493,469 | 2/1970 | Porter | 203—39 |
| 3,449,244 | 6/1969 | Clay et al. | 210—511 |
| 2,995,500 | 8/1961 | Dilbert | 203—98 |

WILBUR L. BASCOMB, Jr., Primary Examiner

U.S. Cl. X.R.

202—181, 204; 203—14, 98; 210—540